United States Patent [19]

Frieder et al.

[11] Patent Number: 4,869,588
[45] Date of Patent: Sep. 26, 1989

[54] NON-PROGRESSIVE MULTIFOCAL OPHTHAMIC LENSES

[75] Inventors: Philip M. Frieder, Miami, Fla.; Michael Walach, Toronto, Canada

[73] Assignee: Opticorp, Inc., Lauderdale, Fla.

[21] Appl. No.: 190,149

[22] Filed: May 4, 1988

Related U.S. Application Data

[63] Continuation-in-part of Ser. No. 95,891, Sep. 14, 1987, abandoned.

[51] Int. Cl.⁴ .............................................. G02C 7/06
[52] U.S. Cl. .................................... 351/168; 351/171
[58] Field of Search ............... 351/168, 169, 170, 171, 351/172

[56] References Cited

U.S. PATENT DOCUMENTS

| | | | |
|---|---|---|---|
| 1,448,052 | 3/1923 | Brilhart | 351/169 |
| 1,518,405 | 12/1924 | Glancy | 351/169 |
| 3,563,057 | 2/1971 | Rosenbauer | 351/169 |
| 3,687,528 | 8/1972 | Maitenaz | 351/169 |
| 3,711,191 | 1/1973 | Tagnon | 351/169 |
| 4,461,550 | 7/1984 | Legendre | 351/169 |
| 4,484,804 | 11/1984 | Mignen | 351/169 |
| 4,514,061 | 4/1985 | Winthrop | 351/169 |
| 4,592,630 | 6/1986 | Okazaki | 351/169 |

FOREIGN PATENT DOCUMENTS

| | | | |
|---|---|---|---|
| 2448244 | 4/1976 | Fed. Rep. of Germany | 351/171 |
| WO82/03129 | 9/1982 | World Int. Prop. O. | 351/169 |

Primary Examiner—Scott J. Sugarman
Attorney, Agent, or Firm—Bachman & Lapointe

[57] ABSTRACT

The present invention relates to a multifocal ophtalmic lens which comprises a first substantially spherical area for distance viewing, a second substantially spherical area for near viewing having a desired width and height and being surrounded on a plurality of sides by the first area, and relatively narrow areas intermediate the first and second areas for blending the second area into the first area. The lens design of the present invention may also include an optional third substantially spherical area adjacent the second area for increasing the near viewing range in a substantially contiguous manner.

12 Claims, 3 Drawing Sheets

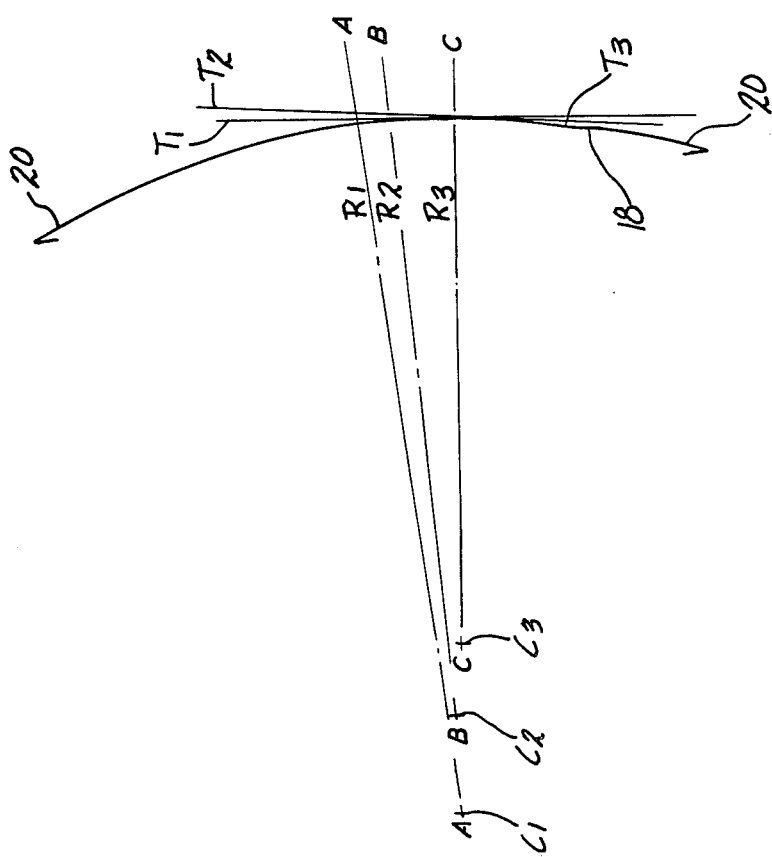
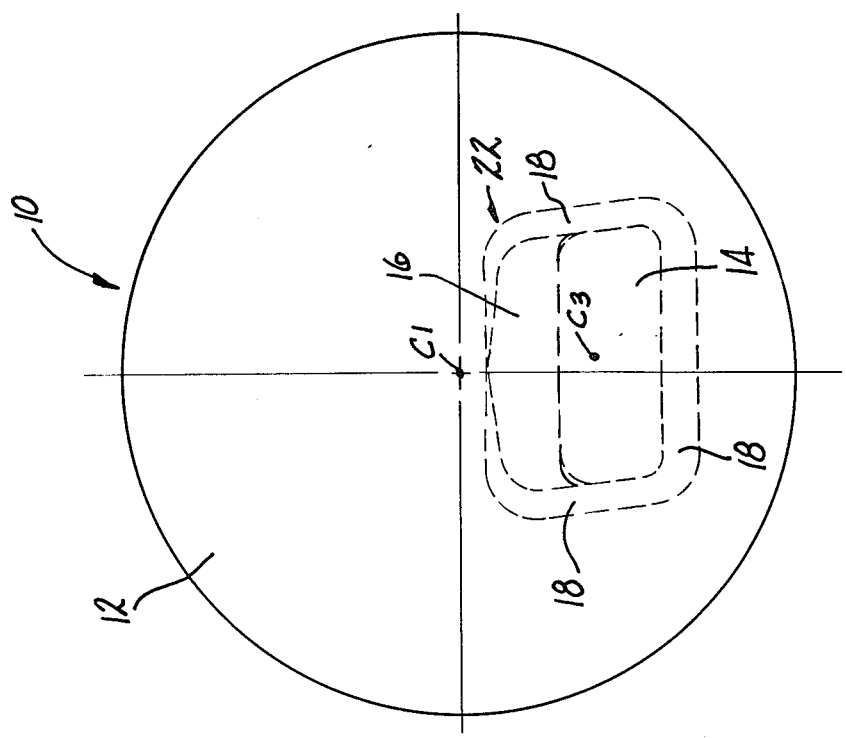
FIG-2
FIG-1

NON-PROGRESSIVE MULTIFOCAL OPHTHAMIC LENSES

CROSS REFERENCE OF RELATED APPLICATION

This application is a continuation-in-part of U.S. patent application Ser. No. 095,891, filed Sept. 14, 1987, now abandoned, to OPHTHALMIC LENSES by Philip M. Frieder et al.

BACKGROUND OF THE INVENTION

The present invention relates to ophthalmic lenses for use in eye wear.

Multifocal lenses have been used in situations requiring spectacle correction for presbyopia. Often patients using such correction devices encounter disturbing problems inherent in many designs. These problems include image jump, limited range of clear vision, annoying reflections from the edge of lens segments and cosmetic objections. For example, conventional flat top, curve top and ribbon shaped segments have ledges which either protrude from the plastic lenses or are fused within the glass lenses. These lenses often reflect light into the wearer's eye and are cosmetically unappealing because of their obviousness to the observer.

Attempts have been made to correct these problems through the use of round segments. Such segments, however, still provide a clearly noticeable, cosmetically unattractive boundary between the near and distance areas. Many round and flat top segments provide clear vision for distance and near viewing but fail to overcome the problem of image jump when passing from the near viewing zone to the distance vision zone and vice versa. Several early attempts to deal with these problems are shown in U.S. Pat. Nos. 1,448,052 and 1,518,405.

In recent years, progressive lenses have been used to correct presbyopia. Progressive lenses besides their obvious cosmetic appeal provide a continuous range of focal powers. This benefit is partially offset by the peripheral astigmatism and distortion aberrations that are unavoidably present in almost all progressive lenses. The design of modern progressive lenses often centers on reducing these unwanted distortions. U.S. Pat. Nos. 3,687,528, 3,711,191, 4,461,550, 4,484,804, 4,514,061 and 4,592,630 illustrate some of the progressive lenses known in the art.

One of the deficiencies of currently available progressive lenses is that they do not provide sphericity for near viewing. Instead they use large numbers of radii in an attempt to give a gradual progression in vertically increasing power. They make the assumption that it is necessary to provide clear vision for all near working distances. The problem which arises from this is that each progressively shorter radius leaves an area of uncorrectable distortion as it departs from the connecting point which is the vertical center line of the segment. Vision with standard progressive lenses is conceptually clear at the center line of the lens. In practice, however, the human eye typically requires an area at least 18 to 35 mm wide for horizontal field comfort.

Some progressives also include blended areas which extend all the way to the edges of the lens. These blended areas are intended to minimize distortion and achieve cosmetic appeal. The erroneous assumption made by the designers of such lenses is that patients can tolerate distance distortion. Still another deficiency of many progressive lenses is that they have narrow corridors of power increase which are difficult for opticians to correctly position, especially for reading. It is also difficult for the user to aim the lens toward the reading area.

Accordingly, it is an object of the present invention to provide an ophthalmic lens which provides clear viewing substantially without distortion in both near and distance viewing areas.

It is a further object of the present invention to provide a lens as above having an extended near viewing range when required.

It is a still further object of the present invention to provide a lens as above in which there is substantially no image jump.

It is yet another object of the present invention to provide a lens as above which is cosmetically appealing and has no visible transition lines.

It is yet another object of the present invention to provide a lens as above which can be easily fitted to the user.

These and other objects and advantages will become clearer from the following description and drawings.

SUMMARY OF THE INVENTION

The foregoing objects are achieved through the design and use of a multifocal ophthalmic lens which comprises a first substantially spherical area for distance viewing, a second substantially spherical area for near viewing having a desired width and height and being surrounded on a plurality of sides by the first area, and relatively narrow areas intermediate the first and second areas for blending the second area into the first area. The lens design of the present invention may also include a third substantially spherical area adjacent the second area for increasing the near viewing range in a substantially contiguous manner.

To accommodate the natural inward turning of the eyes when viewing objects at a near distance, the near distance viewing area(s) are preferably inclined nasalward. The many advantages attendant to this design include minimal areas of distortion resulting from the blending of various lens segments, the relative absence of distortion in the long distance viewing area, an extended near vision viewing range, and ease of fit for a dispensing optician.

BRIEF DESCRIPTION OF THE DRAWINGS

FIG. 1 illustrates a front view of a lens in accordance with the present invention.

FIG. 2 illustrates a side view of a lens designed in accordance with the present invention.

DETAILED DESCRIPTION

Figure 3:
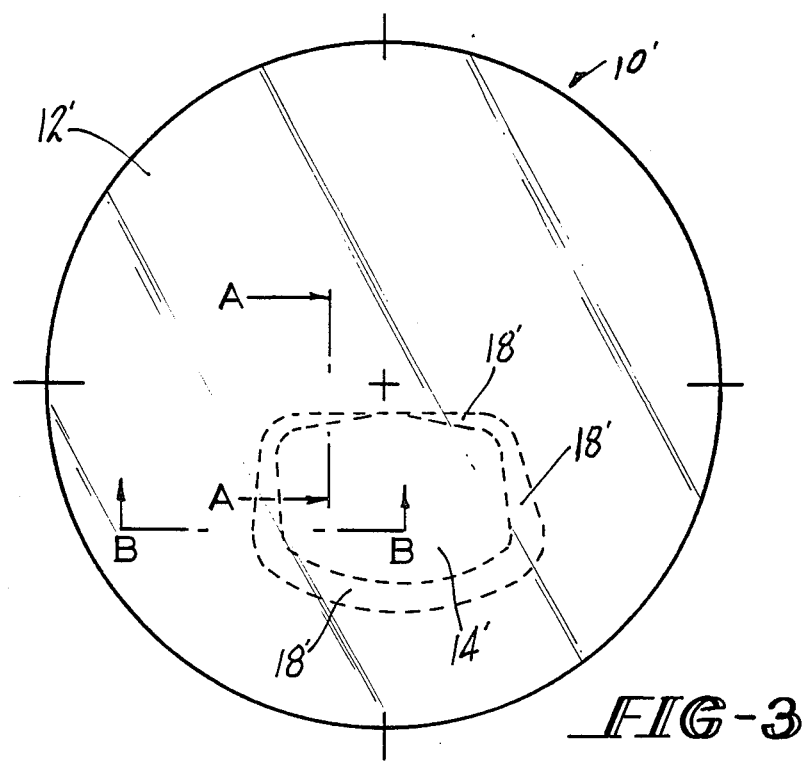
FIG. 3 illustrates a front view of a bifocal lens formed in accordance with the present invention.

As previously discussed, the present invention relates to a multifocal ophthalmic lens for providing correction of presbyopia. Lenses in accordance with the present invention provide the desired correction without encountering problems such as image jump, annoying reflections from segment edges and large amounts of distortion. In addition, lenses in accordance with the present invention are cosmetically appealing.

Referring now to the drawings, FIG. 1 illustrates a multifocal lens 10 in accordance with the present invention. The lens 10 is characterized by a first substantially spherical area 12 for distance viewing, a second substantially spherical area 14 for near viewing, an optional third substantially spherical area 16 for extending the viewing range provided by the second area in a substantially contiguous manner, and areas 18 for blending the second and third areas into the first area.

The sphericity of the areas 12, 14 and/or 16 is important for a number of reasons. First, spherical or substantially spherical viewing areas are particularly desirable from the standpoint of providing clear, undistorted areas of vision in both near and far viewing ranges. Second, the spherical construction of the viewing areas combined with the unique method of connection described herein permit the lens to be fabricated without the cosmetically unappealing lines or ledges which appear in many conventional bifocal and trifocal designs.

As can be seen from FIG. 1, the relatively narrow blend areas 18 are located on the sides of the areas 14 and 16, at portions of the top of area 16 and at the bottom of the near distance viewing area 14. In most cases, these blend areas will have a width of less than about 10 mm, preferably less than about 6 mm. This is also quite significant in terms of providing a lens with relatively little distortion. It should also be noted that the lens of the present invention differs from many progressive lenses in that the blend areas do not extend to the lens edges. As will be described in more detail hereinafter, the blend areas 18 may be produced using any suitable technique known in the art. Preferably, the curvature of these areas is determined through the use of sinusoidal curves.

One of the real advantages attendant to the lenses of the present invention is that the depth, width and shape of the areas 14 and 16 can be arbitrarily chosen for convenience and patient comfort. For example, the width of each near distance viewing area may be in the range of from about 18 mm. to about 45 mm. and the depth of each area may be in the range of from about 11 mm. to about 28 mm. It is preferred, however, that each of the areas 14 and 16 have a substantially flat top portion. As can be seen from FIG. 1, the long distance viewing area 12 surrounds each of the areas 14 and 16 on a plurality of sides, preferably at least three sides.

The intermediate viewing or third area 16 is truly optional in that it may not be needed at all for a patient. Bifocal ophthalmic lenses such as that shown in FIG. 3 may be formed using the same design considerations, e.g. sphericity, sinusoidal blending, etc. as those described in connection with lenses having three viewing areas. Such a bifocal lens has a first substantially spherical area 12' for distance viewing, a second substantially spherical area 14' for near viewing having a desired width and height and surrounded on one or more sides by the first area and relatively narrow areas 18' intermediate the first area. The near viewing area 14' of the bifocal lenses formed in accordance with the present invention may have any desired add power. It is preferred in the bifocal lens however that the near viewing area 14' have a substantially flat top portion.

Figure 4:
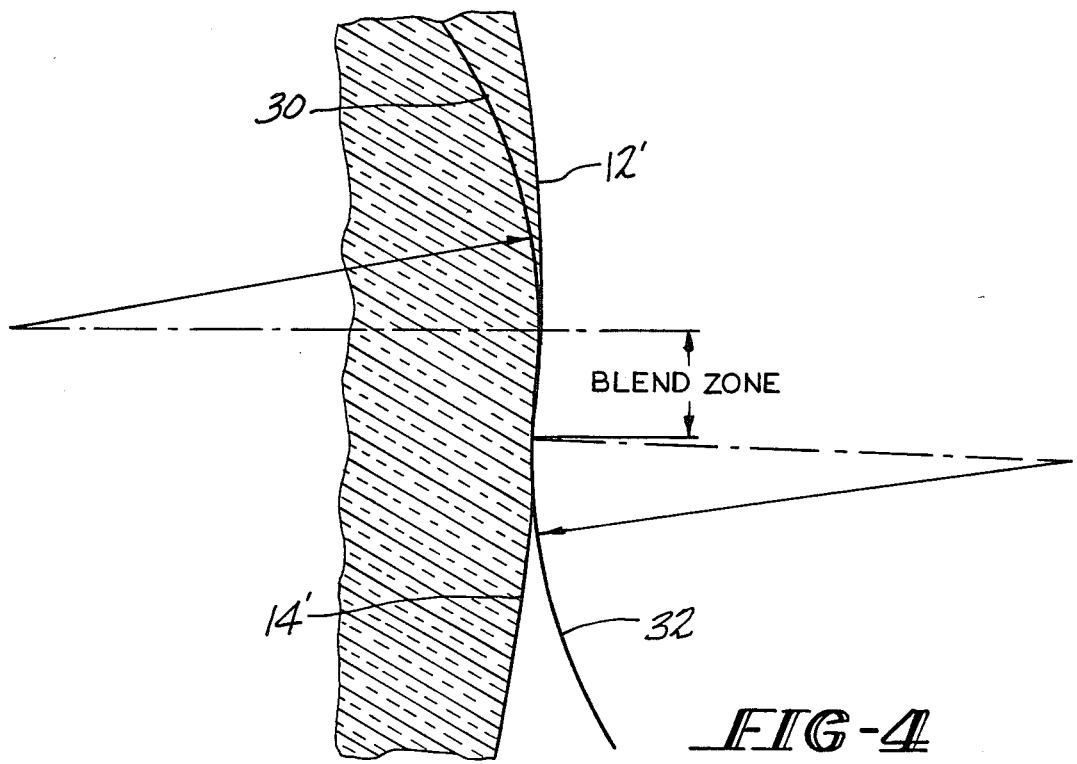
FIG. 4 is a sectional view taken along line A—A in FIG. 3 and shows the blending of the lens areas.
Figure 5:
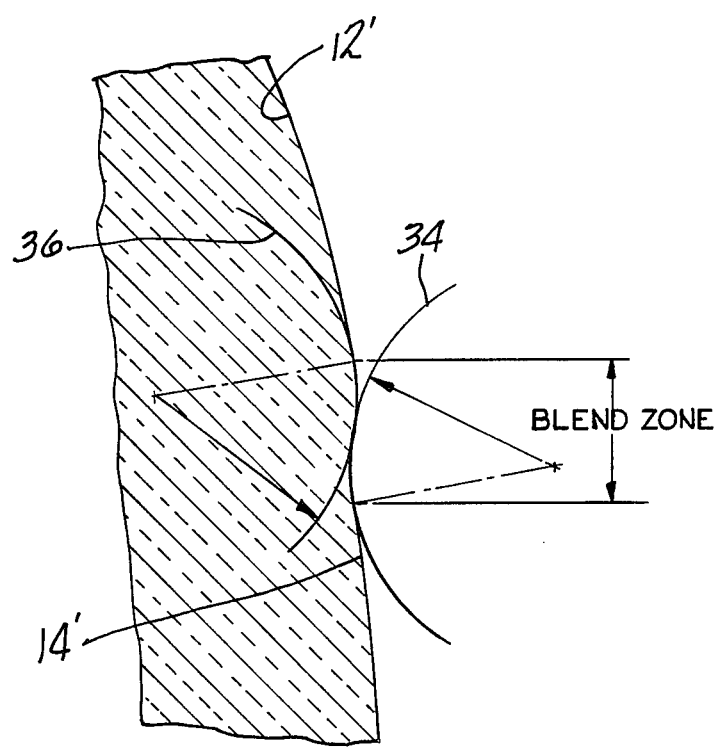
FIG. 5 is a sectional view taken along line B—B in FIG. 3 and shows the blending of the lens areas.

The technique employed to sinusoidally blend the distance viewing area 12' and the near viewing area 14' is illustrated in FIGS. 4 and 5. The area 12' is defined by a first arc having a radius $R_1$ while the area 14' is defined by a second arc having a radius $R_2$ different from the radius $R_1$. For reasons which relate to the principles behind the method of connection of the arcs and which are described in more detail hereinafter, the two arcs substantially coincide for some distance. This coincidence negates the need to blend the very top portion of the area 14' into the area 12'. Other portions where the two arcs do not coincide are blended by areas 18'. These areas adjacent the top portion of the area 14' are blended by drawing two arcs 30 and 32, each having the same radius. The radius is that of the maximum curve that contacts a segment of a viewing area and the other arc. The arc 30 is drawn on one side of the lens while the arc 32 is drawn on the opposite side with one arc tangent to a portion of the arc defining viewing area 12', the other arc tangent to a portion of the arc defining area 14', and the two arcs 30 and 32 tangent to each other. Since the two arcs 30 and 32 have the same radius, they will define a sinusoidal blend area between the areas 12' and 14'. As can be seen from FIG. 5, the areas 12' and 14' are blended along the sides in a similar fashion using arcs 34 and 36. The radii of the arcs 30, 32, 34 and 36 used to blend the areas 12' and 14' differ from point to point around the area 14'. They are chosen however consistent with the above considerations and the principles and desired goals outlined herein. The result is a bifocal lens having a near viewing area integrated into a distance viewing area.

When it is determined that a lens must have an intermediate viewing area 16, the power required for the intermediate area can be determined by beginning with the prescription that is normally prescribed for a bifocal addition. From this the near and far range of vision for the intermediate viewing or third area 16 can be determined from the following equations:

$$\text{Far Range} = \frac{40}{\text{Add}} \quad (1)$$

$$\text{Near Range} = \frac{40}{\text{Add} + U.A. + D.A.} \quad (2)$$

where Add = The add prescribed for comfortable reading between 14" to 16";

U.A. = The total amount of usable accommodation which is +2.50 minus the reading add; and D.A. = Depth of focus which is a constant +0.25.

Therefore, if a patient receives a prescription for a +2.00 D. add, the far range is 20" and the near range is 14.6". In using equation (2), it should be noted that U.A. can never be less than zero. Therefore, for prescribed adds, greater than 2.5, the U.A. is always zero because there is no visual accommodation left.

As previously discussed, the primary purpose of the intermediate viewing area 16 is to extend the viewing range provided by the near viewing area 14 in a substantially contiguous manner. This may be done using the following table.

TABLE 1

| Add Bifocal Power | Range, In. | % of Add Used for Second (Upper) Intermediate/Area Actual Power | Intermediate Range, In. | Total Extended Range, In. |
|---|---|---|---|---|
| +1.00 | 14.6–40 | —/— | — | 14.6–40 |
| +1.25 | 14.6–40 | —/— | — | 14.6–40 |

TABLE 1-continued

| Add Bifocal Power | Range, In. | % of Add Used for Second (Upper) Intermediate/Area Actual Power | Intermediate Range, In. | Total Extended Range, In. |
|---|---|---|---|---|
| +1.50 | 14.6-26 | 66%/+1.00 | 17.7-40 | 14.6-40 |
| +1.75 | 14.6-22.8 | 57%/+1.00 | 20-40 | 14.6-53 |
| +2.00 | 14.6-20 | 62.5%/+1.25 | 20-32 | 14.6-32 |
| +2.25 | 14.6-17.7 | 77.7%/+1.75 | 17.7-22.8 | 14.6-22.8 |
| +2.50 | 14.6-16 | 80%/+2.00 | 17.7-20 | 14.6-20 |
| +2.75 | 13.3-14.6 | 81.8%/+2.25 | 16-17.7 | 13.3-17.7 |
| +3.00 | 12.3-13.3 | 83.3%/+2.50 | 14.6-16 | 12.3-16 |

By locating the prescribed bifocal add power, one can determine the power needed for the intermediate area 16.

The following example illustrates how a lens similar to that shown in FIG. 1 is designed. With reference to FIG. 2, assume the lens is to have a +6.00 D. front base curve with a +2.00 D. bifocal add. The radius $R_1$ for the 6.00 D. curve is determined by dividing the constant 530, the standard index of refraction of optical glass, by 6. Thus $R_1$ equals 83.33 mm. An arc 20 representing the distance viewing area 12 is drawn. The arc of course has a central axis A—A. The intermediate area 14 begins at a desired distance, preferably about 3 mm, below the central axis A—A. At this point, a tangent $T_1$ is constructed. A line B—B perpendicular to the tangent $T_1$ is also constructed. The center $C_2$ for the radius $R_2$ of the intermediate section lies along the line B—B. Since the bifocal add is +2.00 D., the power of the intermediate area 16 can be determined using Table 1. In this case, the intermediate power is +1.25 D. To obtain the radius $R_2$ of the intermediate area, the standard index of refraction 530 is divided by the sum of +1.25 D. and +6.00 D. Thus, $R_2$ equals 73.1 mm. A point 73.1 mm from the intersection of tangent $T_1$ and line B—B along line B—B forms the center $C_2$ of the intermediate area. A second arc representing the intermediate area is then drawn from the tangent $T_1$ to a point approximately 7 mm below. At this point, a second tangent $T_2$ is drawn and another perpendicular line C—C is constructed. The point defined by the intersection of the tangent $T_2$ and line C—C represents the upper limit of the near field viewing range 14. The radius $R_3$ of curvature for the area 14 is determined by dividing 530 by the sum of the +2.00 D. add, the prescribed bifocal add, and +6.00 D. The radius $R_3$ is thus 66.25 mm. The center $C_3$ of the area 14 is determined by moving a distance 66.25 mm along the line C—C from the tangent $T_2$. The area 14 comprises an arc beginning at the tangent $T_2$ and traveling downward a desired distance, approximately 13 mm. The point $T_3$ which is 13 mm below the tangent $T_2$ determines the bottom of the near field viewing area. As shown in FIGS. 1 and 2, this point is then blended into the rest of the lens determined by the arc 20 defined using radius $R_1$.

It has been found that by using this design technique the adjacent arcs defining the viewing areas 12, 14 and 16 nearly coincide for some distance. It is the coincidence of these lines that eliminates the transition lines normally seen in bifocals and trifocals. This near coincidence also negates the need to blend the upper portion of the segments 14 and 16 to the next adjacent portion. Thus, blending is limited to the sides of the areas 14 and 16, portions of the top of area 16, and the bottom of area 14. At these points, blending curves are used to connect the short radii to the longer radius of the distance curve.

While it is preferred to use sinusoidal blending curves as shown in FIG. 3, cotangent and/or any other set of blending curves known in the art could be used with the same results. The object is simply to connect the near and intermediate viewing segments 14 and 16 to the distance vision area 12 in as narrow an areas as possible with the aesthetic advantages of invisibility having an extremely high priority so that there will be no visible transition lines. It should be noted from FIG. 2 that the centers $C_2$ and $C_3$ of the areas 16 and 14, respectively, do not lie along the central axis A—A.

In accordance with the foregoing, it can be seen that lenses designed in accordance with the present invention provide:

(a) a relatively wide area of increased power for clear vision with substantially no image jump;

(b) a completely spherical and clear distance vision area outside the blended near area boundary lines;

(c) a lens with clear distance vision and one or two near viewing areas but having no visible transition lines;

(d) a lens with an increased powered area for near viewing and clear distance vision for peripheral vision and spacial orientation inferiorly;

(e) a lens with an increased powered near area which is easy to correctly position for the dispensing optician; and (f) a lens with substantially spherical reading and extended near close work areas.

In addition, the lens of the present invention may have a standard thickness. This further distinguishes the lens 10 from progressive lenses which tend to be thicker at the center.

The lens of the present invention could be made from either glass or plastic using any suitable fabrication technique. For example, the lens could be fabricated using a ceramic platform or a metal mold produced using computer directed numerically controlled pantograph machining. The metal molds may be used to cast plastic lenses while the ceramic platforms may be used for glass molds which cast lenses. If necessary, the lenses can be finished using standard grinding and polishing techniques. Further, if desired, the finished lens can be bonded to a single vision distance prescription lens.

Preferably, the segment 22 formed by areas 14 and/or 16 is inclined nasalward as one looks downward to view at near working distances. For example, the center $C_3$ of the near area 14 may be 2 mm nasalward from the center $C_1$ of the distance area 12 to accommodate for the natural inward turning of eyes when viewing objects at a near distance.

It is apparent that there has been provided in accordance with this invention an ophthalmic lens which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A non-progressive multifocal ophthalmic lens which comprises a first substantially spherical, clear area for distance viewing, a second substantially spherical, clear area for near viewing, said second area having a desired width and depth and being surrounded on a plurality of sides by said first area, and areas intermediate said first and second areas for blending said second area into said first area, said lens being characterized by substantially no image jump.

2. A lens in accordance with claim 1 wherein said second area has a substantially flat top portion.

3. A lens in accordance with claim 2 wherein said second area is surrounded on at least three sides by said first area.

4. A lens in accordance with claim 3 which further comprises a third substantially spherical, clear area for intermediate viewing, said third area lying adjacent said second area and forming with said second area a substantially contiguous range of near vision.

5. A lens in accordance with claim 4 wherein said third area has a substantially flat top portion and is surrounded by said first area on at least three sides, said third area being blended into said first area.

6. A lens in accordance with claim 4 wherein said second and third areas each have a width in the range of from about 18 mm to about 45 mm.

7. A lens in accordance with claim 5 wherein said blending areas do not extend to the edges of said lens so as to minimize distortion.

8. A lens in accordance with claim 7 wherein said blending areas are each formed by sinusoidal curves and each have a width less than about 10 mm.

9. A lens in accordance with claim 4 wherein said second and third area are angled nasalward.

10. A lens in accordance with claim 4 wherein each of said first, second and third areas is defined by an arc, and a portion of said arc defining said first area coincides with a portion of said arc defining said third area and a portion of said arc defining said third area coincides with a portion of said arc defining said second area.

11. A lens in accordance with claim 10 wherein said first area has a central axis with its center lying along said axis and said second and third areas each having a center lying below said axis.

12. A non-progressive bifocal ophthalmic lens which comprises:
   a first substantially spherical, clear area for distance viewing;
   said first area being defined by a first arc having a first radius;
   a second substantially spherical, clear area for near viewing;
   said second area having a desired width and height and being surrounded on a plurality of sides by said first area;
   said second area being defined by a second arc having a second radius different from said first radius;
   said first and second areas coinciding for some distance and thereby negating any need to blend a first portion of said second area into said first area; and
   areas intermediate said first and second areas for blending said second area into said first area where said first and second arcs do not coincide,
   said lens being characterized by the absence of substantially any image jump.

* * * * *